US012695988B2

(12) United States Patent
Brigot et al.

(10) Patent No.: US 12,695,988 B2
(45) Date of Patent: Jul. 28, 2026

(54) SYSTEMS AND METHODS FOR DYNAMICALLY STABILIZING VIDEOS

(71) Applicant: GoPro, Inc., San Mateo, CA (US)

(72) Inventors: Guillaume Brigot, Charenton-le-Pont (FR); Nicolas Rahmouni, Paris (FR); Luis Mario Domenzain, Paris (FR); Vincent Riauté, Carrieres sous Poissy (FR); Austin Whitfield-Hill, San Jose, CA (US); Jorhabib Eljaik Gómez, Paris (FR)

(73) Assignee: GoPro, Inc., San Mateo, CA (US)

( * ) Notice: Subject to any disclaimer, the term of this patent is extended or adjusted under 35 U.S.C. 154(b) by 53 days.

(21) Appl. No.: 18/972,114

(22) Filed: Dec. 6, 2024

(65) Prior Publication Data

US 2025/0106510 A1     Mar. 27, 2025

Related U.S. Application Data

(63) Continuation of application No. 18/182,709, filed on Mar. 13, 2023, now Pat. No. 12,167,132.

(60) Provisional application No. 63/370,012, filed on Aug. 1, 2022.

(51) Int. Cl.
*H04N 23/68* (2023.01)

(52) U.S. Cl.
CPC ................................. *H04N 23/683* (2023.01)

(58) Field of Classification Search
None
See application file for complete search history.

(56) References Cited

U.S. PATENT DOCUMENTS

| | | | | |
|---|---|---|---|---|
| 10,643,303 | B1 * | 5/2020 | Cotoros ................. | H04N 23/90 |
| 11,477,381 | B1 * | 10/2022 | Karpushin .............. | G06T 7/215 |
| 2019/0289216 | A1 * | 9/2019 | Ito ......................... | H04N 23/687 |
| 2020/0084358 | A1 * | 3/2020 | Nadamoto ......... | H04N 23/6812 |
| 2020/0162674 | A1 * | 5/2020 | Ito ........................... | G03B 5/00 |
| 2022/0247930 | A1 * | 8/2022 | Derbanne ............ | H04N 23/683 |

* cited by examiner

*Primary Examiner* — James M Hannett
(74) *Attorney, Agent, or Firm* — Esplin & Associates, PC

(57) ABSTRACT

A video may be captured by an image capture device. A stabilized view of the video may be generated by using a punchout of the video. The shape and/or size of the punchout may be dynamically changed based on stabilization performance of the video. The shape and/or size of the punchout may be changed when the punchout is moving within the video. The shape and/or size of the punchout may not be changed when the punchout is not moving within the video.

20 Claims, 7 Drawing Sheets

System 10

System 10

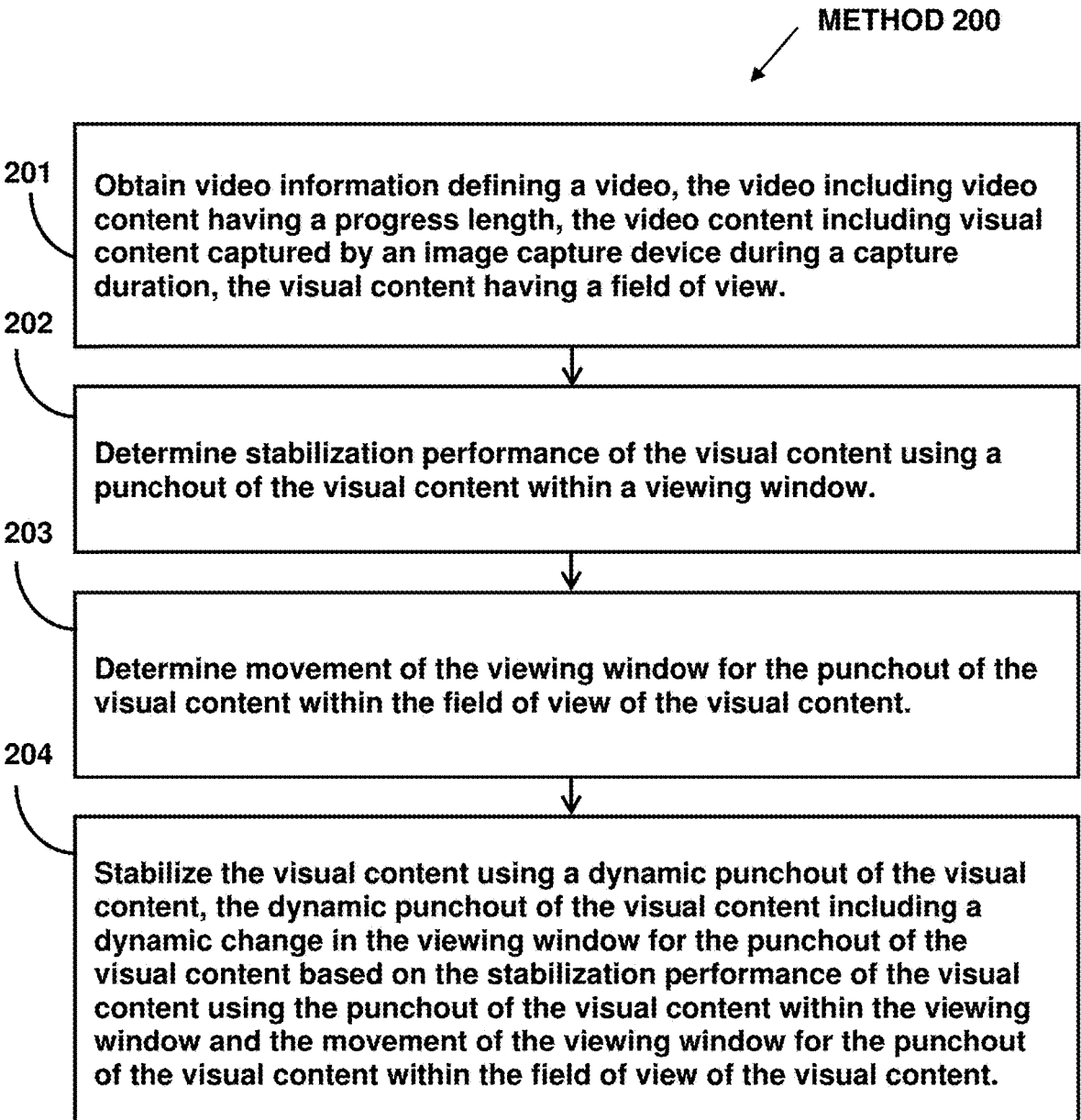

METHOD 200

201 Obtain video information defining a video, the video including video content having a progress length, the video content including visual content captured by an image capture device during a capture duration, the visual content having a field of view.

202 Determine stabilization performance of the visual content using a punchout of the visual content within a viewing window.

203 Determine movement of the viewing window for the punchout of the visual content within the field of view of the visual content.

204 Stabilize the visual content using a dynamic punchout of the visual content, the dynamic punchout of the visual content including a dynamic change in the viewing window for the punchout of the visual content based on the stabilization performance of the visual content using the punchout of the visual content within the viewing window and the movement of the viewing window for the punchout of the visual content within the field of view of the visual content.

FIG. 2 image A 400
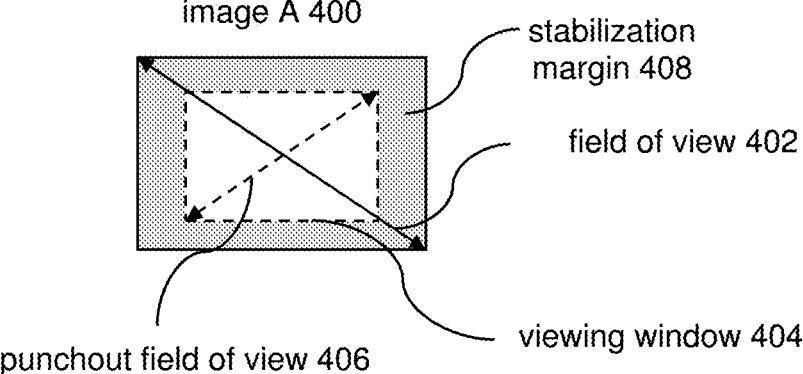
stabilization margin 408
field of view 402
punchout field of view 406
viewing window 404
image B 410
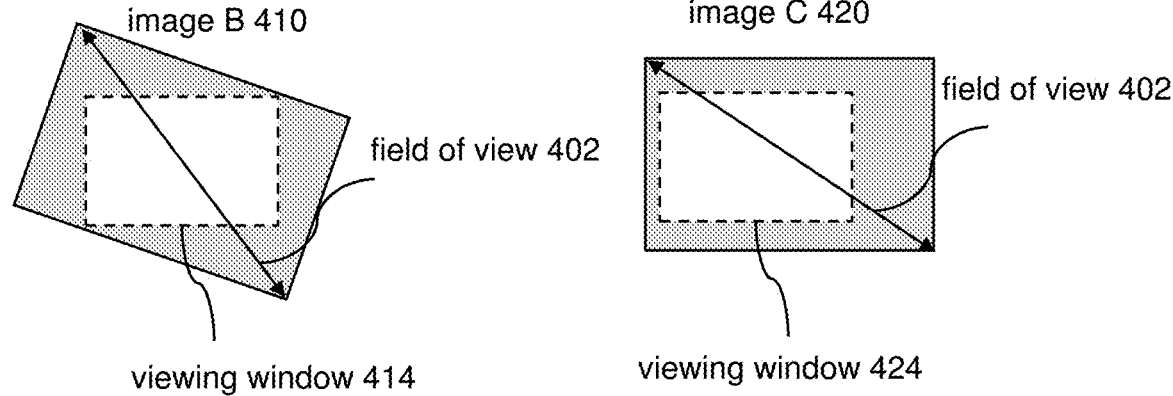
field of view 402
viewing window 414
image C 420
field of view 402
viewing window 424
FIG. 4

502

512

504

514

602

604

SYSTEMS AND METHODS FOR DYNAMICALLY STABILIZING VIDEOS

FIELD

This disclosure relates to dynamically changing a viewing window to stabilize videos.

BACKGROUND

A video may be stabilized to provide a smoother/less jerky view. Some parts of the video may be shakier than others. Using the same stabilization for the entire video may not be desirable.

SUMMARY

This disclosure relates to dynamically stabilizing videos. Video information and/or other information may be obtained. The video information may define a video. The video may include video content having a progress length. The video content may include visual content captured by an image capture device during a capture duration. The visual content may have a field of view. Stabilization performance of the visual content using a punchout of the visual content within a viewing window may be determined. Movement of the viewing window for the punchout of the visual content within the field of view of the visual content may be determined. The visual content may be stabilized using a dynamic punchout of the visual content. The dynamic punchout of the visual content may include a dynamic change in the viewing window for the punchout of the visual content based on the stabilization performance of the visual content using the punchout of the visual content within the viewing window, the movement of the viewing window for the punchout of the visual content within the field of view of the visual content, and/or other information.

A system for dynamically stabilizing videos may include one or more electronic storage, processor, and/or other components. The electronic storage may store video information, information relating to a video, information relating to video content, information relating to visual content, information relating to stabilization performance, information relating to a viewing window, information relating to movement of the viewing window, information relating to stabilization of the visual content, information relating to a dynamic punchout of the visual content, and/or other information.

The processor(s) may be configured by machine-readable instructions. Executing the machine-readable instructions may cause the processor(s) to facilitate dynamically stabilizing videos. The machine-readable instructions may include one or more computer program components. The computer program components may include one or more of a video information component, stabilization performance component, movement component, dynamic stabilization component, and/or other computer program components.

The video information component may be configured to obtain video information and/or other information. The video information may define a video. The video may include video content having a progress length. The video content may include visual content and/or other content captured by an image capture device during a capture duration. The visual content may have a field of view.

The stabilization performance component may be configured to determine stabilization performance of the visual content using a punchout of the visual content within a viewing window. In some implementations, the stabilization performance of the visual content using the punchout of the visual content within the viewing window may include a number of times the stabilization requires the viewing window to extend beyond the field of view of the visual content. In some implementations, the stabilization performance of the visual content using the punchout of the visual content within the viewing window may include an amount of stabilization margin between the viewing window and the field of view of the visual content.

The movement component may be configured to determine movement of the viewing window for the punchout of the visual content within the field of view of the visual content. In some implementations, the movement of the viewing window for the punchout of the visual content within the field of view of the visual content may include a change in placement of the viewing window within the field of view of the visual content between different video frames of the video.

The dynamic stabilization component may be configured to stabilize the visual content using a dynamic punchout of the visual content. The dynamic punchout of the visual content may include a dynamic change in the viewing window for the punchout of the visual content based on the stabilization performance of the visual content using the punchout of the visual content within the viewing window, the movement of the viewing window for the punchout of the visual content within the field of view of the visual content, and/or other information. In some implementations, the dynamic change in the viewing window may include a change in shape and/or size of the viewing window.

In some implementations, the dynamic change in the viewing window may include switching between a first viewing window and a second viewing window different from the first viewing window. The first viewing window may be determined based on user selection and/or other information. The second viewing window may be determined based on the user selection of the first viewing window and/or other information.

In some implementations, the dynamic change in the viewing window may include a successive change through three or more different viewing windows.

In some implementations, responsive to the stabilization performance of the visual content using the punchout of the visual content within the viewing window indicating that the stabilization is possible using a larger and/or wider viewing window: (1) the dynamic change in the viewing window may include a change to the larger and/or wider viewing window based on the movement of the viewing window for the punchout of the visual content within the field of view of the visual content including the viewing window moving more than a threshold amount; and (2) the dynamic change in the viewing window may not include the change to the larger and/or wider viewing window based on the movement of the viewing window for the punchout of the visual content within the field of view of the visual content including the viewing window not moving more than the threshold amount.

In some implementations, the dynamic change in the viewing window and the stabilization of the visual content using the dynamic punchout of the visual content may be performed by the image capture device during capture of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for dynamically stabilizing videos.

FIG. 4 illustrates example placement of viewing windows within images.

DETAILED DESCRIPTION

Figure 1:
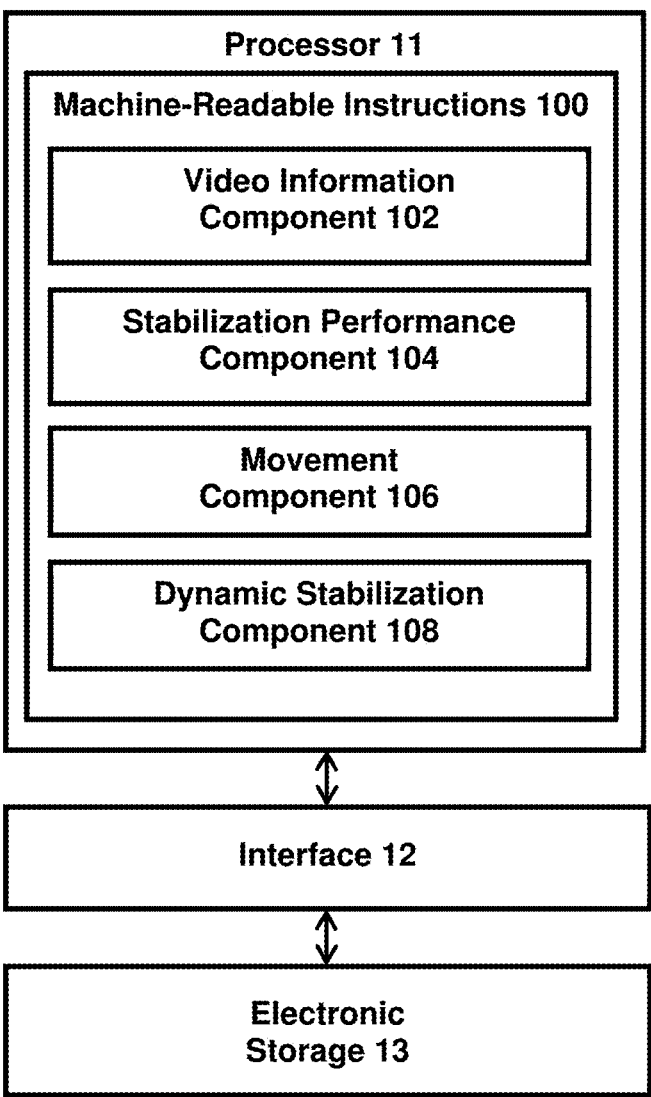
FIG. 1 illustrates an example system for dynamically stabilizes videos.

FIG. 1 illustrates a system 10 for dynamically stabilizing videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information and/or other information may be obtained by the processor 11. The video information may define a video. The video may include video content having a progress length. The video content may include visual content captured by an image capture device during a capture duration. The visual content may have a field of view. Stabilization performance of the visual content using a punchout of the visual content within a viewing window may be determined by the processor 11. Movement of the viewing window for the punchout of the visual content within the field of view of the visual content may be determined by the processor 11. The visual content may be stabilized by the processor 11 using a dynamic punchout of the visual content. The dynamic punchout of the visual content may include a dynamic change in the viewing window for the punchout of the visual content based on the stabilization performance of the visual content using the punchout of the visual content within the viewing window, the movement of the viewing window for the punchout of the visual content within the field of view of the visual content, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to video content, information relating to visual content, information relating to stabilization performance, information relating to a viewing window, information relating to movement of the viewing window, information relating to stabilization of the visual content, information relating to a dynamic punchout of the visual content, and/or other information.

Visual content (of image(s), of video frame(s), of video(s)) with a field of view may be captured by an image capture device during a capture duration. Visual content may refer to content of image(s), video frame(s), and/or video(s) that may be consumed visually. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
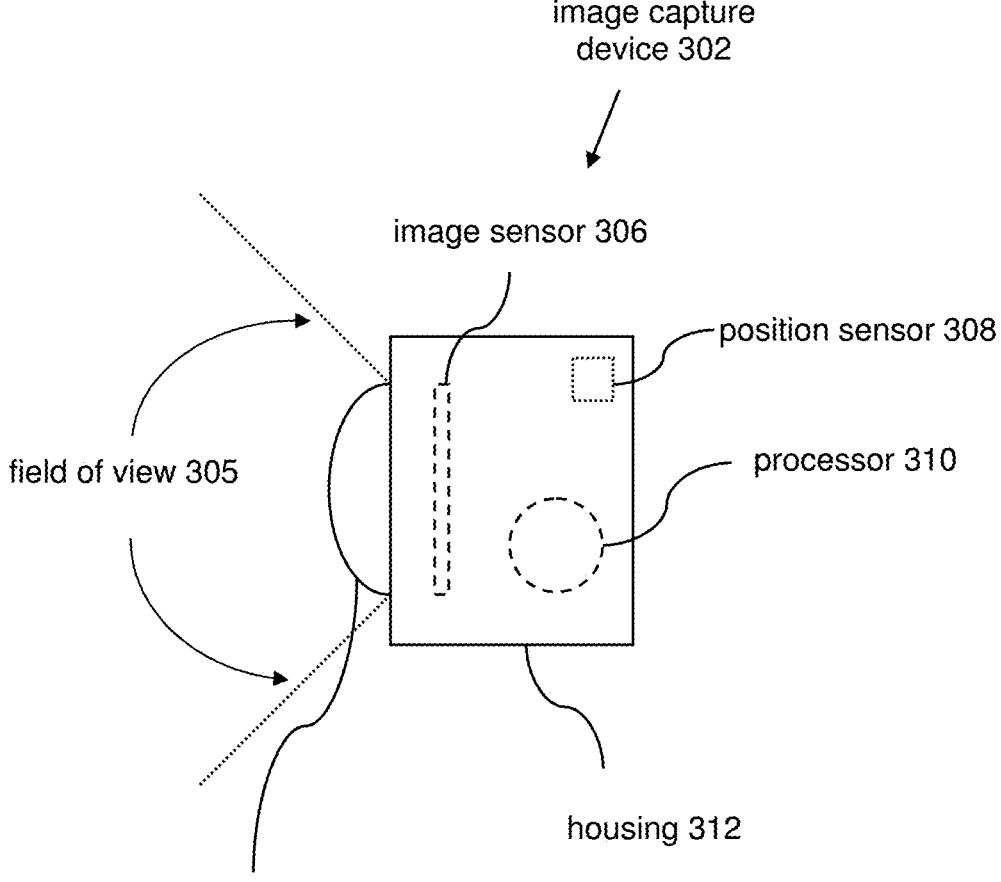
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), jtool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view

305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

A punchout of the visual content within a viewing window may be used to stabilize the visual content captured by the image capture device 302. The field of view 305 may be larger than a size of the punchout/viewing window used to generate stabilized visual content. Stabilization of visual content may include reduction/removal of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable.

Portions of the visual content captured from light within the field of view 305 may be presented on a display and/or used to generate a video. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not include or includes less motion than the original visual content. For instance, the visual content may include shaky/jerky footage due to motion of the image capture device 302 during visual content capture, and the viewing window may be determined so that the portion of the visual content that is presented/used for video generation does not appear shaky/jerky or appears less shaky/jerky. For example, the shape, size, and/or the location of the viewing window within the visual content may be determined to compensate for motion of the image capture device 302 during capture such that the video appears to have been captured from an image capture device 302 with less motion. The visual content captured by the image capture device 302 may be cropped to generate stabilized visual content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, visual content having a field of view may be captured by the image capture device 302 during a capture duration. The processor 310 may use the position information to stabilize the visual content captured through the optical element 304 and the image sensor 306. The processor 310 may determine the positions (e.g., rotational positions, translational positions) of the image capture device as a function of progress through the capture duration and use the positions of the image capture device to determine placement of the viewing window within the field of view of the visual content for stabilization of the visual content. The visual content within the viewing window may be used (e.g., cropped) to generate stabilized visual content.

The placement of the viewing window may compensate for the motion (e.g., unintentional motion) of the image capture device during the capture duration. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame). The viewing window may be oriented with respect to the field of view of the visual content based on movement of the viewing window within the field of view and/or movement of the field of view around the viewing window (e.g., movement of visual content in image space).

FIG. 4 illustrates example placement of viewing windows 404, 414, 424 within images 400, 410, 420. The images 400, 410, 420 may have a field of view 402. The images 400, 410, 420 may include capture of a scene within an angle defined by the field of view 402. The viewing windows 404, 414, 424 may have a punchout field of view 406. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a stabilization margin 408 within which the viewing window 404 may move with respect to the image A 400/field of view 402. The stabilization margin 408 may specify how much the viewing window 404 may move while remaining inside the field of view 402 of the visual content included within the image A 402.

Placements of the viewing window 404, 414, 424 within the field of view 402 (orientation of the viewing window 404 with respect to the field of view 402) may be changed to perform video stabilization. For example, the viewing window 414 may be rotated with respect to the field of view 402 of the image B 410 while not going beyond the pixels captured within the image B 410. The viewing window 424 may be laterally moved with respect to the field of view 402 of the image C 420 while not going beyond the pixels captured within the image C 420. The placements of the viewing window 404, 414, 424 may be determined based on the positions/motions of the image capture device when the images 400, 410, 420 were captured.

For instance, the viewing window 414 may be oriented with respect to the field of view 402 of the image B 410 to provide a punchout of the image B 410 that is stable with respect to a prior and/or next punchout of the images (e.g., stable with the punchout of the image A 400 using the viewing window 404 for the image A 400). The orientation of the viewing window 414 with respect to the field of view 402 of the image B 410 may be determined based on the rotational position of the image capture device from which the image B 410 was captured. Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

Using a smaller punchout/viewing window (e.g., smaller punchout field of view) may enable greater stabilization of motion within the visual content caused by the motion of the image capture device. Using a smaller punchout/viewing window may enable the punchout to be moved to greater extent before the punchout hits an edge of the visual content. However, smaller punchout/viewing window may provide a smaller view (smaller portion) of the visual content.

Using a dynamic punchout of visual content may enable stabilization to be adapted for different types/amount of motion during visual content capture. A dynamic punchout of the visual content may include a dynamic change in the viewing window for the punchout of the visual content based on stabilization performance of the visual content using the punchout of the visual content within the viewing window. Stabilization performance may indicate how well the visual content is being stabilized. Stabilization performance may indicate how much the stabilization is being pushed. Stabilization performance may indicate how much the stabilization may be changed (e.g., to stronger stabilization, to weaker stabilization). Stabilization performance may indicate an extent to which stabilization is able to be performed using the punchout of the visual content with a viewing window of a particular size and/or shape. Stabilization performance may be used to dynamically change the punchout/viewing window that is being used to stabilize the visual content.

For example, the size of the viewing window to provide punchout of the visual content may be changed based on the stabilization performance. For instance, based on stabilization performance indicating that the current size of the viewing window is too large to stabilize the visual content (e.g., stabilization margin is too small, stabilization requires viewing window to extend beyond the field of view of the visual content), the size of the viewing window may be decreased. Based on stabilization performance indicating that the current size of the viewing window is smaller than needed (e.g., stabilization margin is too big, stabilization is keeping the viewing window far from the end of the field of view of the visual content), the size of the viewing window may be increased.

Dynamically changing the size of the punchout/viewing window may enable larger spatial extents of the visual content to be included within the punchout/viewing window when the visual content is captured by a relatively stable image capture device and smaller spatial extents of the visual content to be included within the punchout/viewing window when the visual content is captured by a shaky image capture device. However, simply changing the size of the punchout/viewing window may result in a zooming effect within the stabilized visual content. For instance, increasing the size of the punchout/viewing window while maintaining the shape of the punchout/viewing window may result in the stabilized visual content appearing to have been captured while zooming out. Decreasing the size of the punchout/viewing window while maintaining the shape of the punchout/viewing window may result in the stabilized visual content appearing to have been captured while zooming in. Such zooming effect (linear zooming effect) may be apparent within the stabilized visual content and may be distracting.

The shape of the punchout/viewing window may be changed to include differently shaped spatial extents of the visual content within the stabilization visual content. The shape of the punchout/viewing window may be changed based on the stabilization performance. Differently shaped punchout/viewing window may have different sizes, resulting in different amount of stabilization margin for movement/placement of the punchout/viewing window for stabilization. For instance, based on stabilization performance indicating that the current size of the viewing window is too large to stabilize the visual content (e.g., stabilization margin is too small, stabilization requires viewing window to extend beyond the field of view of the visual content), the shape of the viewing window may be changed to one with smaller size (e.g., narrower viewing window). Based on stabilization performance indicating that the current size of the viewing window is smaller than needed (e.g., stabilization margin is too big, stabilization is keeping the viewing window far from the end of the field of view of the visual content), the shape of the viewing window may be changed to one with larger size (e.g., wider viewing window).

The shape of the punchout may determine the type of distortion present within the visual content. Distortion may refer to deviation from rectilinear projection. Rectilinear projection may store and/or present the visual content such that a straight line within a scene captured within the visual content appears straight in the visual content (e.g., in the image, video frame). Non-rectilinear projection may store and/or present the visual content such that a straight line within a scene captured within the visual content appears curved in the visual content. For instance, a wide field of view punchout may include the visual content using a non-rectilinear projection, while a linear field of view punchout may include the visual content using the rectilinear projection. Use of other projections is contemplated.

For example, the shape of a wide field of view punchout may result in a distortion (e.g., barrel distortion) such that a straight line within the scene appears curved within the wide field of view punchout of the visual content. The shape of a linear field of view punchout may not result in the distortion (e.g., barrel distortion) such that a straight line within the scene appears straight within linear field of view punchout of the visual content. The size of the wide field of view punchout may be larger than the size of the linear field of view punchout. Greater extent of the visual content included within the wide field of view punchout may include greater amount of distortion than the smaller extent of the visual content included within the linear field of view punchout. The distortion within the wide field of view punchout make dynamic changes in the amount of visual content included in the punchout less evident. That is, the zooming effect from for switching between a wide field of view punchout and a linear field of view punchout may be less obvious and less distracting then zooming effect from simply changing the size of the punchout/viewing window without changing the shape of the punchout/viewing window.

Figure 5A:
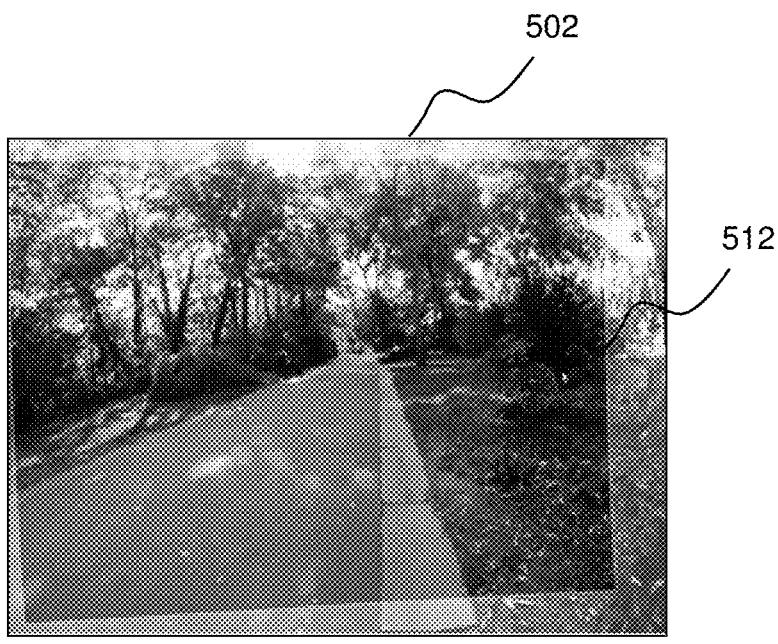
FIG. 5A illustrates an example wide viewing window for an image.
Figure 5B:
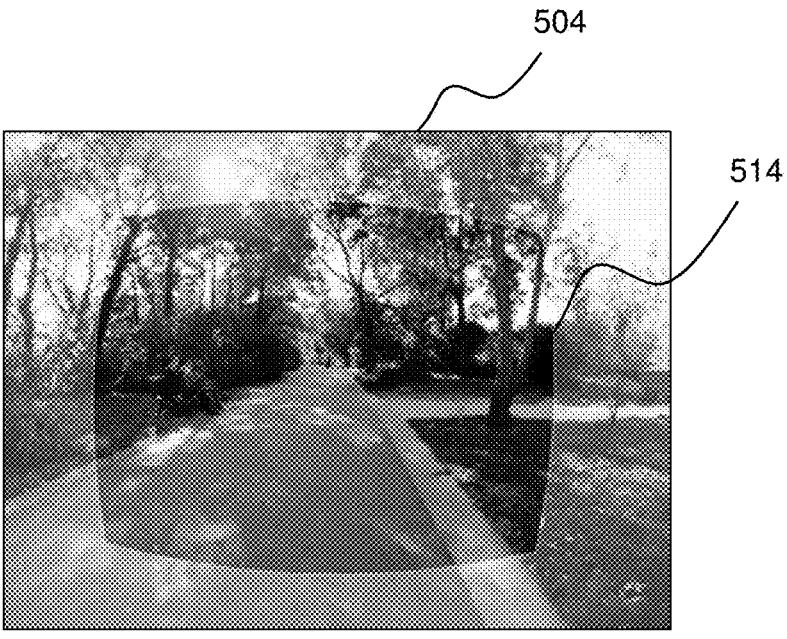
FIG. 5B illustrates an example linear viewing window for an image.

FIG. 5A illustrates an example wide viewing window 512 for an image 502, and FIG. 5B illustrates an example linear viewing window 514 for an image 504. The images 502, 504 may have been captured by an image capture device (e.g., the image capture device 302). The images 502, 504 may have a field of view, such as a wide field of view. For example, the field of view 305 may include a wide field of view and the visual content of the images 502, 504 may include the wide field of view. The visual content of the images 502, 504 may include wide field of view depictions of the scene captured within the images 502, 504. The wide viewing window 512 may be used to provide a wide field of view punchout of the image 502 while the linear viewing window 512 may be used to provide a linear field of view punchout of the image 504. The shape of the wide viewing window 512 may cause the wide field of view punchout of the image 502 to include distortion (e.g., barrel distortion causing fish-eye effect), while the shape of the linear viewing window 514 may cause the linear field of view punchout of the image 504 to not include distortion.

Figure 6A:
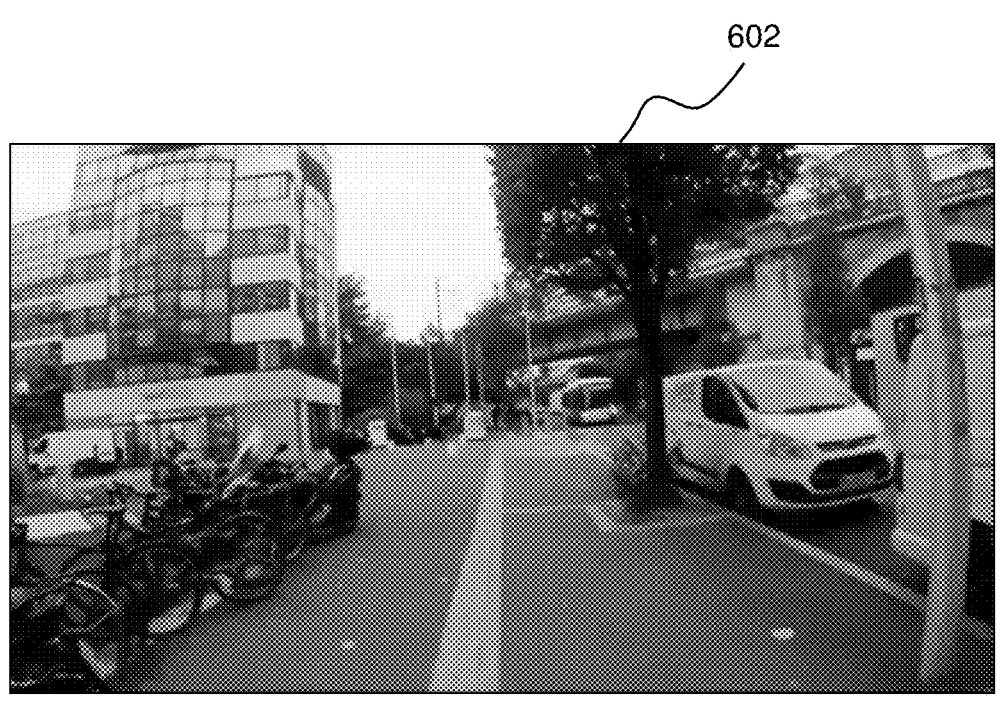
FIG. 6A illustrates an example wide field of view punchout of an image.
Figure 6B:
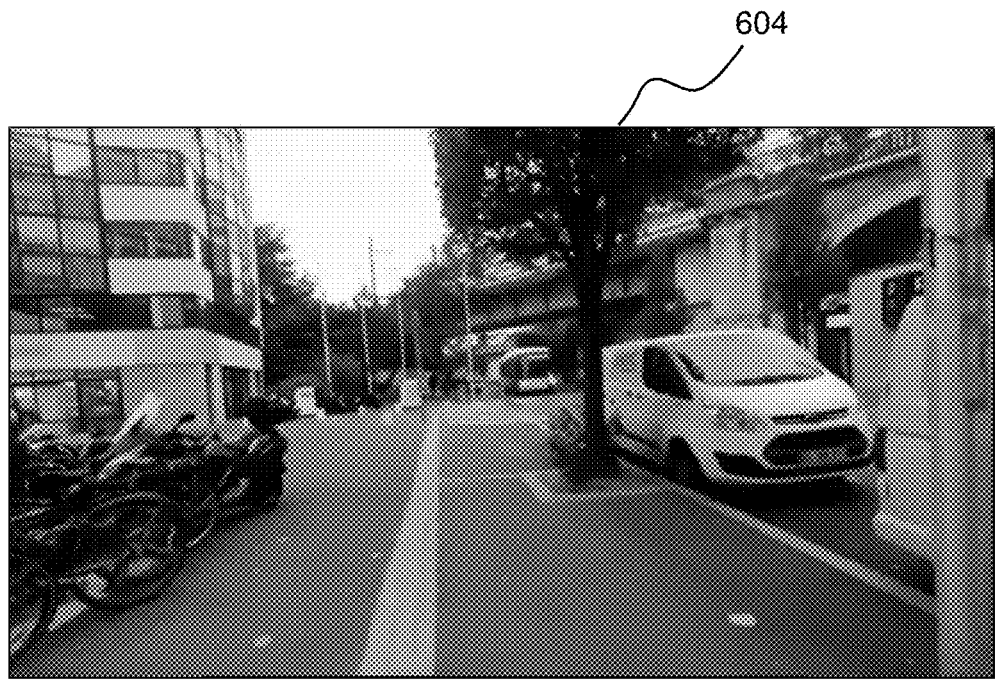
FIG. 6B illustrates an example linear field of view punchout of an image.

FIG. 6A illustrates an example wide field of view punchout 602 of an image. Use of the wide field of view punchout may result in barrel distortion within the wide field of view punchout 602. FIG. 6B illustrates an example linear field of view punchout 604 of an image. Use of the linear field of view punchout may result in back of barrel distortion within the linear field of view punchout 604. Other shapes of viewing window, other shapes of punchouts, and other distortions of visual content are contemplated.

As shown, a linear viewing window/punchout may be smaller than a wide window/punchout. For example, a wide viewing window/punchout may be larger or equal to 120 degrees (e.g., horizontal angle) and a linear viewing window/punchout may be smaller or equal to 90 degrees (e.g., horizontal angle). The smaller size of the linear viewing window/punchout may provide greater stabilization margin than the wide viewing window/punchout to move within the image for stabilization. The larger size of the wide viewing window/punchout may provide less stabilization margin than the linear viewing window/punchout to move within the image for stabilization.

Even though greater amount of spatial extent of the visual content is included within the wide field of view punchout 602 than the linear field of view punchout 604, switching between the wide field of view punchout 702 to the linear field of view punchout 704, or vice versa, may not include a perceivable zooming effect. Switching between the wide field of view punchout 702 to the linear field of view punchout 704, or vice versa, may include less perceivable zooming effect than switching between same-shaped punchouts of different sizes.

The switch between the usage of the wide field of view punchout and the usage of the linear field of view punchout for stabilization of visual content of images/video frames may not cause a linear zooming effect within punchouts. A linear zooming effect may include same change in zoom through the spatial extent of the visual content. For example, change in viewing window by a factor of 2× may result in a linear zooming effect in which appearances of different portions of the visual content are doubled in size. Such change in sizes of the visual content may be more apparent to a viewer.

The switch between the usage of the wide field of view punchout and the usage of the linear field of view punchout for stabilization of visual content of images/video frames may cause a non-linear zooming effect within punchouts. A non-linear zooming effect may include different changes in zoom and/or warping through the spatial extent of the visual content. For example, the peripheral portions of the wide field of view punchout may include more zooming/warping than the center portion of the wide field of view punchout. The appearances of the center portion of the wide field of view punchout and the linear field of view 702 may be the same or not include as much change as the peripheral portions.

Such non-linear changes within the punchout of the visual content may not be apparent or may not be as apparent as linear changes in punchout of the visual content (linear zooming effect), especially when the visual content includes motion (e.g., forward motion, reverse motion, panning motion) due to intentional motion of the image capture device during visual content capture. For example, depiction of scenes (e.g., objects, environment) within visual content may be change as a function of progress through the progress length of the visual content due to forward motion of the image capture device during visual content capture (e.g., person wearing a camera that is recording a video while jogging). Such motion may disguise the non-linear changes within the punchout of the visual content caused by switching between the usage of the wide field of view punchout and the usage of the linear field of view punchout for stabilization of visual content.

Perceivability of zoom effect from change in size/shape of the viewing window/punchout may be reduced when there is motion present in the viewing window/punchout. Perceivability of zoom effect from change in size/shape of the viewing window/punchout may be reduced when the placement of the viewing window/punchout changes over time/between video frames. Perceivability of zoom effect from change in size/shape of the viewing window/punchout may be increased when there is no motion present in the viewing window/punchout. Perceivability of zoom effect from change in size/shape of the viewing window/punchout may be increased when the placement of the viewing window/punchout remain static over time/between video frames.

For example, dynamic changes in the viewing window for visual content captured by a still image capture device may be more easily perceived by a user than dynamic changes in the viewing window for visual content captured by a moving image capture device. Dynamic changes in the viewing window for visual content depicting a still scene may be more easily perceived by a user than dynamic changes in the viewing window for visual content depicting a moving scene.

Perceivability of zoom effect from use of a dynamic punchout of the visual content may be reduced by limiting changes to the viewing window to those parts of the video in which the viewing window is moving. A threshold amount of viewing window movement (between different moments in the progress length of the video, between different video frames) may be required for changes to the viewing window (e.g., change in shape, change in size) to be enabled. The movement of the viewing window may be measured and used to determine whether the viewing window/punchout may be changed or should remain the same.

The movement of the viewing window may be measured as the amount and/or direction of movement of the viewing window within the field of view of the visual content. The movement of the viewing window may be measured as the change in translational and/or rotational location of the viewing window within the field of view of the visual content over time or between video frames. For example, the movement of the viewing window may be measured as the orientation between placement of the viewing window between two different video frames (orientation between the placement of the viewing window in frame N and the placement of the viewing window in frame N+1).

In some implementations, same threshold amount of viewing window movement may be required for change in viewing window that increases or decreases the size of the viewing window. In some implementations, different threshold amounts of viewing window movement may be required for change in viewing window that increases or decreases the size of the viewing window. For example, change in viewing window that increases the amount of spatial extent of the visual content included in the viewing widow may be made more conservative/constrained by using a higher value of viewing window movement threshold for the change in viewing window that increases the amount of spatial extent of the visual content included in the viewing widow, and a lower value of viewing window movement threshold may be used for the change in viewing window that decreases the amount of spatial extent of the visual content included in the viewing widow. That is, change that increases the field of view of the viewing window may require higher amount of viewing window movement to be enabled and change that decreases the field of view of the viewing window may require lower amount of viewing window movement to be enabled. As another example, the values of the viewing window movement threshold may be set in other way so that change that increases the field of view of the viewing window may require lower amount of viewing window movement to be enabled and change that decreases the field of view of the viewing window may require higher amount of viewing window movement to be enabled. Different threshold amounts may be set to cause a hysteresis effect in viewing window changes.

In some implementations, the visual content captured by the image capture device may be leveled as the function of progress through the progress length based on the rotational positions of the image capture device as the function of progress through the capture duration and/or other information. That is, the visual content captured by the image captured device may be rotated to compensate for rotation of the image capture device during the capture duration such that a view of the visual content includes depiction of leveled scene. For example, readings from the position sensor may be used to determine the direction of gravity when visual content is captured at different moments within the capture duration. The direction of gravity may be used to determine the amount of rotation that needs to be applied to the visual content to level the depiction within the visual content. For example, the visual content may be rotated so that the direction of gravity is pointed downwards. The rotation of the visual content may be effectuated through rotation of the visual content itself and/or through orientation of the punchout/viewing window with respect to the field of view of the visual content.

Referring back to FIG. 1, the processor 11 (or one or more components of the processor 11) may be configured to obtain information to facilitate dynamically stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamically stabilizing videos. The machine-readable instructions 100 may include one or more computer program components. The machine-readable instructions 100 may include one or more of a video information component 102, stabilization performance component 104, movement component 106, dynamic stabilization component 108, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more hardware components (e.g., an image sensor) and/or one or more software components (e.g., software running on a computing device).

some implementations, the video information component 102 may obtain video information based on user interaction with a user interface/application (e.g., video editing application, video player application), and/or other information. For example, a user interface/application may provide option(s) for a user to select one or more videos that are to be stabilized and/or played. The video information defining the video may be obtained based on the user's selection of the video content through the user interface/video application. Other selections of video are contemplated.

The video information may define a video. The video information component 102 may obtain video information defining a video while the video is being captured by an image capture device. The video information component 102 may obtain video information defining a video after the video has been captured and stored in memory (e.g., the electronic storage 13).

The video may include video content captured by an image capture device during a capture duration. The video content may have a progress length. The progress length of the video content may correspond to the capture duration for the video. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content of one or more scenes captured by an image capture device during the capture duration. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects). The video content may include visual content captured at different moments within the capture duration. The visual content may be viewable as a function of progress through the progress length. The visual content may have a field of view, such as the field of view 305 shown in FIG. 3. In some implementations, the field of view of the visual content may include a wide field of view, and the visual content may include a wide field of view depiction of the scene(s). In some implementation, wide field of view depiction of a scene may include one or more distortions of the visual content, such as a barrel distortion and/or other distortions.

The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames). Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The visual content may be stabilized using a punchout of the visual content and/or other information. Visual content may be stabilized provide a smoother view of the captured visual content. Stabilization of visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content.

The punchout of the visual content may include one or more spatial extents of the visual content as a function of progress through the progress length of the visual content to compensate for motion of the image capture device during the corresponding moments within the capture duration. The punchout of the visual content may include different field of view punchouts of the visual content over (e.g., as a function of progress through) the progress length of the visual content. Different field of view punchouts may include punchouts with different shapes, punchouts with different distortion characteristics (e.g., barrel roll distortion of a wide field of view, non-distortion of a linear field of view), and/or punchouts with different sizes.

For example, the punchout of the visual content may include a wide field of view punchout of the visual content, a linear field of view punchout of the visual content, and/or other field of view punchout of the visual content. The linear field of view punchout may be smaller than the wide field of view punchout (e.g., shown in FIGS. 5A, 5B). For example, the wide field of view punchout may be larger or equal to 120 degrees (e.g., horizontal angle) and the linear field of view punchout may be smaller or equal to 90 degrees (e.g., horizontal angle).

Stabilized visual content (visual content within the punchout) may include one or more distortions based on usage of one or more field of view punchouts. The stabilized visual content may include one or more distortions corresponding to the used field of view punchout. For example, the stabilized visual content may include a distortion (e.g., barrel distortion) corresponding to the wide field of view punchout based on usage of the wide field of view punchout such that a straight line within the scene appears curved within the stabilized visual content (e.g., shown in FIG. 6A). The stabilized visual content may not include the distortion (e.g., barrel distortion) corresponding to the wide field of view punchout based on usage of the linear field of view punchout such that a straight line within the scene appears straight within the stabilized visual content (e.g., shown in FIG. 6B).

In some implementations, the stabilized visual content may include less distortion (e.g., barrel distortion) corresponding to the wide field of view punchout based on usage of a field of view punchout between the linear field of view punchout and the wide field of view punchout such that a straight line within the scene appears less curved within the stabilized visual content than based on usage of the wide field of view punchout, but appears more curved within the stabilized visual content than based on usage of the linear field of view punchout. Other shapes, sizes, and distortions of punchout are contemplated.

Thus, changing between different field of view punchout may result in different field of view distortion being included within the stabilized visual content. That is, changing between different field of view punchout for stabilization may result in adjustment of field of view distortion.

The punchout of the visual content may include extents of the visual content within one or more viewing windows. A viewing window may define one or more extents of the visual content. A viewing window may define extents of the visual content to be included within stabilized visual content as the function of progress through the progress length. A viewing window may define which portions of the visual content are included within the stabilized visual content at different moment within the progress length. Inclusion of the extents of the visual content defined by the viewing window within the stabilized visual content may effectuate stabilization of the visual content.

A viewing window may be placed within the field of view of the visual content. Placement of the viewing window within the field of view of the visual content may be determined based on positions (e.g., rational positions, translational positions, changes in positions) of the image capture device during the capture duration and/or other information. For example, the placement of the viewing window within the field of view of the visual content may change as a function of progress through the progress length of the visual content based on rotational positions of the image capture device and/or changes in rotational positions (motion) of the image capture device at different moments within the capture duration (as a function of progress through the capture duration). Determining the placement of the viewing window based on the positions of the image capture device may include determining one or more of viewing directions, viewing rotations, and/or other characteristics of the viewing window. Use of other information to determine placement of the viewing window within the field of view of the visual content is contemplated.

A viewing direction may define a direction of view for visual content. A viewing direction may define the angle/visual portion of the visual content at which the viewing window may be directed. Changes in the viewing direction as the function of progress through the progress length may effectuate lateral/vertical movement (e.g., panning) of the viewing window within the field of view of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The rotation of the viewing window may compensate for rotation of the image capture device during capture duration.

Stabilized visual content may be generated as outputs of portions of the visual captured by the image capture device, with the outputted portions including extent(s) of the visual content within the punchout/viewing window. Inclusion of the extent(s) of the visual content within the punchout/viewing window may effectuate stabilization of the visual content via selective cropping. Stabilized visual content may be generated as encoded visual content and/or as instructions for rendering the stabilized visual content. For instance, the stabilized visual content may be generated as an encoded version/copy of the stabilized visual content (e.g., encoded video file) and/or a director track that defines the extents of the visual content to be used/presented during playback.

For example, the stabilized visual content may be generated as video frames in a video file, and the video file may be opened in a video player for presentation of the stabilized visual content. The stabilized visual content may be generated as instructions to render the visual content for presentation. The instructions (e.g., director track) may which define visual portions of the visual content (images, video frames) should be included within the presentation of the video content. The instructions may include information on the location, size, shape, and/or rotation of the punchout of images/video frames to be used to as a function progress through the progress length of the visual content to provide a stabilized view of the images/video frames. A video player may use the instructions to retrieve the relevant visual portions of the images/video frames when the visual content is opened and/or is to be presented.

The stabilization performance component 104 may be configured to determine stabilization performance of the visual content using a punchout of the visual content within a viewing window. Determining stabilization performance of the visual content using a punchout of the visual content within a viewing window may include ascertaining, calculating, establishing, finding, identifying, and/or otherwise determining the stabilization performance of the visual content using the punchout of the visual content within the viewing window.

Stabilization performance using a punchout of the visual content within a viewing window may refer to how well the visual content has been, is being, and/or may be stabilized using the punchout of the visual content within the viewing window. Stabilization performance may refer an extent to which a desired stabilization has been, is being, and/or may be performed using the punchout of the visual content within the viewing window. The desired stabilization may refer to a targeted stabilization of the visual content, with the targeted stabilization being specified by one or more stabilization parameters, stabilization defaults, user inputs, and/or other information. For example, the desired stabilization may be determined based on one or more of strength of stabilization, stabilization constraints (e.g., keeping an object within the punchout, restricting the movement of the punchout), stabilization algorithm, and/or other information.

In some implementations, stabilization performance may be determined based on an extent to which the desired stabilization is able to be performed using the punchout (e.g., linear field of view punchout, wide field of view punchout) of the visual content within the viewing window and/or other information. To perform the desired stabilization, the punchout/viewing window may need to be moved within the visual content to compensate for motion of the image capture device during capture of the visual content. The desired stabilization may not be performed (obtained) if the motion of the punchout/viewing window extends beyond the field of view of the visual content (violate the stabilization margin). When the desired stabilization requires the punchout/viewing window to extend beyond the field of view of the visual content, the stabilization may be adjusted (e.g., lower strength of stabilization, reduce stabilization constraints, change stabilization algorithm) so that the punchout/viewing window does not extend beyond the field of view of the visual content. Such change in stabilization may not achieve the desired stabilization. For example, such change in stabilization may result in more motion being included within the stabilized visual content.

In some implementations, the stabilization performance of the visual content using the punchout of the visual content within the viewing window may include (e.g., include as a value of stabilization performance, used to determine a value of stabilization performance) a number of times the stabilization requires the viewing window to extend beyond the field of view of the visual content. For example, the stabilization performance may include and/or be determined based how many times over the progress length of the visual content the stabilization tries to place the viewing window beyond the field of view of the visual content (violates stabilization margin). In some implementations, the number of times the stabilization requires the viewing window to extend beyond the field of view of the visual content may be expressed in terms of frequency with which the stabilization requires the viewing window to extend beyond the field of view of the visual content—the number of instances during a portion of the progress length the placement of the viewing window violates the stabilization margin. In some implementation, the number of times the stabilization requires the viewing window to extend beyond the field of view of the visual content may be expressed based on a sliding window over the progress length of the visual content—the sliding window may define portions of a particular size of the progress length and the stabilization performance may indicate the number of times in which the stabilization requires the viewing window to extend beyond the field of view of the visual content within the sliding window.

In some implementations, the stabilization performance of the visual content using the punchout of the visual content within the viewing window may include a spatial amount by which the stabilization requires the viewing window to extend beyond the field of view of the visual content. For example, the stabilization performance may include and/or be determined based how much the stabilization tries to place the viewing window extends beyond the field of view of the visual content (the spatial amount by which the stabilization margin is violated).

In some implementations, the stabilization performance of the visual content using the punchout of the visual content within the viewing window may include both the number of times the stabilization requires the viewing window to extend beyond the field of view of the visual content and the spatial amount by which the stabilization requires the viewing window to extend beyond the field of view of the visual content. For example, both the frequency with which the stabilization requires the viewing window to extend beyond the field of view of the visual content and the spatial amounts by which the viewing window extends beyond the field of view of the visual content may be used in determining the stabilization performance.

In some implementations, the stabilization performance of the visual content using the punchout of the visual content within the viewing window may include an amount of stabilization margin between the viewing window and the field of view of the visual content. For example, the stabilization performance may include and/or be determined based on how much stabilization margin remains unused by the stabilization. The amount of stabilization margin may include how far the edge of the viewing window is from the edge of the field of view of the visual content. The amount of stabilization margin may include how far the edge of the viewing window from the closest edge of the visual content, farthest edge of the visual content, and/or other edge of the visual content.

In some implementations, the stabilization performance of the visual content using the punchout of the visual content within the viewing window may include the amount of image capture device movement during capture of the visual content. For example, the stabilization performance may include and/or be determined based on how much the image capture device moved during capture of the visual content. The movement of the image capture device may include rotational motion and/or translational motion of the image capture device.

For example, the rotational positions of the image capture device during the capture duration may be used to determine overlaps between fields of view of the visual content as a function of progress length of the visual content. The rotational positions of the image capture device during the capture duration may be used to determine to what extent video frames of a video include capture of the same field of view of a scene.

Greater/faster rotational motion of the image capture device during the capture duration may result in smaller overlaps in depictions of the scene within the captured visual content (e.g., adjacent video frames) and smaller/slower rotational motion of the image during the capture duration may result in larger overlaps in depictions of the scene within the captured visual content. The rotational positions of the image capture device as a function of progress through the capture duration may be used to determine to the extent to which the desired stabilization is able to be performed using the punchout of the visual content within the viewing window as a function of progress through the progress length of the visual content.

Stabilization performance using a punchout of the visual content within a viewing window may refer to quantitative and/or qualitative measurement of visual content stabilization that has been, is being, and/or may be performed based on the stabilization margin associated with the field of view of the punchout/viewing window (e.g., larger stabilization margin associated with the linear field of view punchout/viewing window, smaller stabilization margin associated with the wide field of view punchout/viewing window). For example, the stabilization performance may be characterized/indicated by one or more of stabilization score, stabilization level, stabilization percentage, and/or other quantitative and/or qualitative measurement of stabilization. For example, the stabilization performance may range between values of zero and one, with higher values indicating the need to use a viewing window with a smaller field of view and lower values indicating the ability to use a viewing window a larger field of view, or vice versa.

The movement component 106 may be configured to determine movement of the viewing window for the punchout of the visual content within the field of view of the visual content. Movement of the viewing window for the punchout of the visual content within the field of view of the visual content may include one or more changes in placement of the viewing window within the field of view of the visual content over time/between different video frames of the video.

Determining movement of the viewing window for the punchout of the visual content within the field of view of the visual content may include ascertaining, calculating, establishing, finding, identifying, and/or otherwise determining the movement of the viewing window for the punchout of the visual content within the field of view of the visual content. Determining movement of the viewing window may include determining how placement of the viewing window within the field of view of the visual content is changing over time/between video frames. For example, determining movement of the viewing window may include determine how much the translational and/or rotational position of the viewing window within the field of view of the visual content is changing over time/between video frames. Determining movement of the viewing window may include quantifying the amount of changes in placement of the viewing window within the field of view of the visual content over time/between video frames. For example, referring to FIG. 4, movement component 106 may determine changes in placement of the viewing windows 404, 414, 424 within images 400, 410, 420.

In some implementations, the movement of the viewing window for the punchout of the visual content within the field of view of the visual content may be obtained and/or determined from the stabilization of the visual content. The stabilization of the visual content may output placement of the viewing window for different moments/video frames, and the movement of the viewing window may be determined from the placement output by the stabilization.

The dynamic stabilization component 108 may be configured to stabilize the visual content using a dynamic punchout of the visual content. The dynamic change in the viewing window may include one or more changes in shape, size, and/or other characteristic(s) of the viewing window. For example, stabilization of the visual content using the dynamic punchout of the visual content may include stabilization of the visual content where the shape and/or size of the viewing window changes to provide differently shaped and/or sized punchout of the visual content. The dynamic stabilization component 108 may cause the stabilization of the visual content to use differently shaped and/or sized viewing window to provide the punchout as a function of progress through the progress length of the visual content. Changes in shape and/or size of the viewing window may result in different amounts of stabilization margin being available for stabilization of the visual content. Different shapes and/or sizes of viewing window may be used for different portions of the progress length of the visual content based on the amount of stabilization margin needed to stabilize the visual content.

The dynamic punchout of the visual content may include a dynamic change in the viewing window for the punchout of the visual content based on the stabilization performance of the visual content using the punchout of the visual content within the viewing window, the movement of the viewing window for the punchout of the visual content within the field of view of the visual content, and/or other information. The dynamic stabilization component 108 may determine what shape and/or size of the viewing window will be used to provide punchout of the visual content based on the stabilization performance, the movement of the viewing window, and/or other information.

Stabilization performance may be used by the dynamic stabilization component 108 to determine whether the viewing window needs to be changed for the stabilization being performed. Stabilization performance may be used by the dynamic stabilization component 108 to determine whether the viewing window that includes a smaller field of view needs to be used to perform the stabilization (e.g., based on current size and/or shape of the viewing window resulting in too many stabilization margin violations; based on too little/no space existing between the edge of the viewing window and edge of the visual content) or whether the viewing window can be changed to include a larger field of view (e.g., based on current size and/or shape of the viewing winding resulting in no/few stabilization margin violations; based on more than a threshold amount of space existing between the edge of the viewing window and edge of the visual content).

The dynamic stabilization component 108 may change between differently shaped and/or sized viewing window based on shakiness of the image capture device during capture duration. For example, the stabilization performance may be indicated by one or more of stabilization score, stabilization level, stabilization percentage, and/or other quantitative and/or qualitative measurement of stabilization, and the dynamic stabilization component 108 may determine the shape and/or size of the viewing window to be used for stabilization based on one or more of the stabilization score, the stabilization level, the stabilization percentage, and/or other quantitative and/or qualitative measurement of stabilization.

For example, the dynamic stabilization component 108 may change the shape and/or size of the viewing window to increase/decrease the stabilization margin based on the stabilization score, the stabilization level, the stabilization percentage, and/or other quantitative and/or qualitative measurement of stabilization indicating that the motion of the image capture device during the capture duration satisfies/ violates one or more criteria. For instance, the stabilization performance using a particular shape and/or size of the viewing window may be poor (e.g., results in stabilization performance equal to, below, or above a threshold) and the dynamic stabilization component 108 may change the shape and/or size of the viewing window so that the stabilization margin is increased. The stabilization performance using a particular shape and/or size of the viewing window may be good (e.g., results in stabilization performance equal to, above, or below a threshold) and the dynamic stabilization component 108 may switch to the particular the shape and/or size of the viewing window. That is, the stabilization performance of using a particular viewing window may be determined before changing to use the particular viewing window for stabilization. In some implementations, the dynamic stabilization component 108 may use the viewing window that includes the largest extent of the visual content while respecting one or more criteria (e.g., using largest field of view viewing window that results in stabilization performance satisfying a threshold).

For example, the dynamic stabilization component 108 may change stabilization from using a wide viewing window to a linear viewing window based on the stabilization performance using the wide viewing window including a certain number/more than a certain number of instances (e.g., measured as a total number within the progress length, measured as a number within a sliding window, measured as a frequency) in which the stabilization requires the viewing window to extend beyond the field of view of the visual content. The dynamic stabilization component 108 may change stabilization from using the linear viewing window to the wide viewing window based on the stabilization performance using the wide viewing window including a certain number/less than a certain number of instances in which the stabilization requires the viewing window to extend beyond the field of view of the visual content.

The dynamic stabilization component 108 may change stabilization from using the wide viewing window to the linear viewing window based on the stabilization performance indicating that the stabilization requires the wide viewing window to extend beyond the field of view of the visual content by a certain spatial amount/more than a certain spatial amount. The dynamic stabilization component 108 may change stabilization from using the linear viewing window to the wide viewing window based on the stabilization performance indicating that the stabilization requires the wide viewing window to extend beyond the field of view of the visual content by a certain spatial amount/less than a certain spatial amount.

In some implementations, the dynamic change in the viewing window may include a successive change through three or more different viewing windows. For example, a first viewing window punchout may be used for visual content captured by a stable image capture device. The dynamic stabilization component 108 may change from the first viewing window to a second viewing window (that includes smaller field of view than the first viewing window)

based on the visual content having been captured by the image capture device while experiencing shaking motion. The dynamic stabilization component 108 may change from the second viewing window to a third viewing window (that includes smaller field of view than the second viewing window) based on the visual content having been captured by the image capture device while experiencing greater shaking motion. The distortion characteristics of the second viewing window may be greater than the distortion characteristics of the first viewing window, and the distortion characteristics of the third viewing window may be greater than the distortion characteristics of the second viewing window.

In some implementations, the dynamic change in the viewing window may include switching between two different viewing windows. The viewing window used to provide punchout of the visual content may switch continuously between two extreme fields of view. The two different viewing windows may include viewing windows that have different shapes and/or sizes. The two different viewing windows may include/cover different field of view. Whether the viewing window including/covering larger field of view or the viewing window including/covering smaller field of view is used may be determined based on the stabilization performance and/or other information.

In some implementations, one of the viewing windows may be determined based on user selection, and the other viewing window may be determined based on user selection of the one viewing window. For example, the user selected viewing window may be used as the viewing window that includes/covers the larger field of view, and the viewing window that includes/covers the smaller field of view may be selected based on the specific viewing window selected by the user. Different viewing windows may be associated with particular smaller field of view viewing window. For example, individual viewing window may be paired with a viewing window that includes smaller field of view. A user may be provided with options to select the default view viewing window to be used for stabilization, and a smaller field of view specifically associated/paired with the user-selected viewing window may be used as needed (e.g., use the user selected viewing window when the image capture device is steady/includes small motion; use the associated/ paired viewing window when the image capture device is shaky).

In some implementations, changing between different viewing windows may include full/complete switching between different viewing windows. For example, switching from the wide viewing window to the linear viewing window may include the wide viewing window being used for visual content captured at a moment (a video frame) and the linear viewing window being used for visual content captured at the subsequent moment (the next video frame).

In some implementations, changing between different viewing windows may include mixing between different viewing windows. Rather than switching between different viewing windows, the viewing window may be smoothly changed from one viewing window to another viewing window. For example, change from the wide viewing window to the linear viewing window may be performed over a duration within the progress length. Such change in viewing window may allow the distortion characteristics of the stabilized visual content to change over a duration of time/multiple frames rather than from one moment (a video frame) to the next moment (next video frame). Such change in viewing window may provide a continuous change in distortion of the visual content, which may be less apparent.

In some implementations, the value of stabilization performance (e.g., stabilization score) may determine the distortion polynomial for the stabilized visual content. For example, values of zero and one may result in use of different polynomials for the stabilized visual content. Values between zero and one may result in use of intermediate polynomials. In some implementations, a field of view adaptation score may be determined based on the stabilization performance/stabilization score. The field of view adaptation score may indicate which viewing window or what mix of two viewing windows should be used. For example, the field of view adaptation score may include a floating point that indicates the degree to which one or the other viewing window should be used. For a value between zero and one, the value may be used to determine the mix between the two viewing windows (e.g., interpolate between two polynomials of the two viewing windows).

In some implementations, the identity of the viewing window used for stabilization (e.g., shape and/or size of the viewing window, distortion polynomial, stabilization score) may be associated with and/or stored with the video information. For example, the identity of the viewing window used to stabilize different parts of the video may be stored as metadata of the video. For instance, the metadata of the video may store identity of two different viewing windows (a smaller field of view viewing window and a larger field of view viewing window), along with the stabilization score that indicates which one (or what mix) of the two viewing windows was used to stabilize the visual content. Such information may be used for post-processing of the stabilized visual content (e.g., post-stabilization, reversal of stabilization, field of view manipulation).

For example, description of multiple viewing windows (e.g., two viewing windows with extreme fields of view), such as polynomial coefficients and terms to describe polynomial for radial distortion and/or variables (e.g., X term, Y term, XY cross term) to describe warp distortion, may be stored within the metadata of the video. The stabilization performance/stabilization score and/or the field of view adaptation score may be stored within the metadata of the video. The stabilization performance/stabilization score and/or the field of view adaptation score may be stored for individual video frames of the video. The stabilization performance/stabilization score and/or the field of view adaptation score stored for individual video frames may be used to determine what viewing window (e.g., field of view covered by the viewing window, shape of the viewing window, distortion within the viewing window) should be used for the individual video frames.

Figure 7:
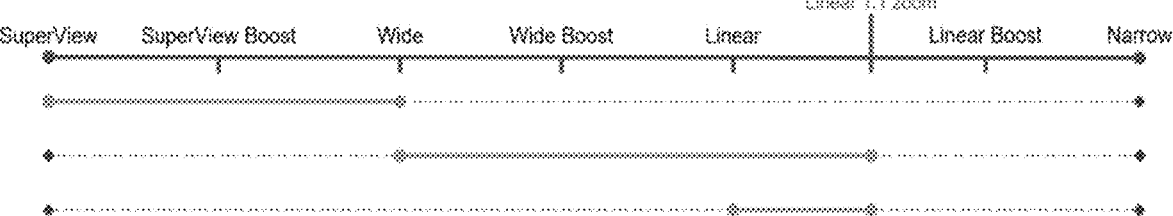
FIG. 7 illustrates example viewing windows to provide a dynamic punchout of visual content.

FIG. 7 illustrates example viewing windows to provide a dynamic punchout of visual content. Other viewing windows are contemplated. The names of different viewing windows may be arranged from those including/covering more (e.g., larger, wider) field of view to those including/covering less (smaller, narrower) field of view. A user may make selection of the viewing window to be used for stabilization via (1) selection of a particular viewing window (e.g., SuperView, Wide, Linear, Narrow) and (2) enabling/disabling stabilization boost. Enabling stabilization boost may result in the selected viewing window being changed to include smaller field of view (e.g., from SuperView to SuperView Boost; from Wide to Wide Boost; from Linear to Linear Boost).

Dynamic change in the viewing window may include the viewing window being changed to one including/covering smaller field of view when needed. Different viewing windows selectable by the user may be associated/paired with a viewing window including/covering smaller field of view. A viewing window may be associated/paired with a viewing window that is normally not selectable by the user (e.g., Linear 1.1 Zoom).

For example, SuperView may be associated/paired with Wide, Wide may be associated/paired with Linear 1.1 Zoom (e.g., linear viewing window with a zoom factor at the center limited to 1.1), and Linear may be associated/paired with Linear 1.1 Zoom. If the user selected use of SuperView viewing window for stabilization, the stabilization may change between SuperView viewing window and Wide viewing window based on stabilization performance and/or other information. If the user selected use of Wide viewing window for stabilization, the stabilization may change between Wide viewing window and Linear 1.1 Zoom viewing window based on stabilization performance and/or other information. If the user selected use of Linear viewing window for stabilization, the stabilization may change between Linear viewing window and Linear 1.1 Zoom viewing window based on the stabilization performance and/or other information. Other pairing/association of viewing windows are contemplated.

While whether the viewing window should be changed may be determined based on the stabilization performance, whether the viewing window is changed may be determined based on the movement of the viewing window for the punchout of the visual content within the field of view of the visual content. The shape and/or the size of the viewing window that should be used for a particular part of the video may be determined based on the stabilization performance, but whether the shape and/or the size for the specific stabilization performance will actually be used to stabilize the visual content may be determined based on the movement of the viewing window. A threshold amount of viewing window movement (e.g., certain change in translational and/or rotational position of the viewing window over a set duration of time/between video frames of certain distance-between video frame N and video frame N+ #) may be required before the viewing window is changed. Such limitation on when the viewing window may be changed may reduce the user's perceivability of the change in the viewing window. By limiting when the viewing window may be changed to those time in which the viewing window is moving, the change in viewing window may become less apparent in the stabilized visual content.

In some implementation, the viewing window change may be limited via use of the viewing window movement regardless of whether the viewing window is being changed to include/cover more of less field of view. That is, the viewing window change may be limited in both directions via the viewing window movement. In some implementations, the viewing window change in only one direction may be limited via use of the viewing window movement. For example, the viewing window movement limitation may be applied only to change in viewing window that increases the field of view and may not be applied to change in viewing window that decreases the field of view, or vice versa.

For example, change in viewing window that increases the field of view included in/covered by the viewing window may be constrained more than change in viewing window that decreases the field of view by using the viewing window movement to limit just the change in viewing window that increases the field of view. When stabilization performance indicates that stabilization needs a viewing window including/covering smaller/narrower field of view, then the viewing window may be changed regardless of viewing window movement. When stabilization performance indicates that stabilization is possible with a viewing window including/covering larger/wider field of view, then the viewing window may be changed only when sufficient viewing window movement is present.

For example, responsive to stabilization performance of the visual content indicating that stabilization is possible using a larger and/or wider viewing window, the dynamic change in the viewing window may include a change to the larger and/or wider viewing window based on the movement of the viewing window including the viewing window moving more than a threshold amount. Responsive to stabilization performance of the visual content indicating that stabilization is possible using a larger and/or wider viewing window, the dynamic change in the viewing window may not include the change to the larger and/or wider viewing window based on the movement of the viewing window of including the viewing window not moving more than the threshold amount.

In some implementations, the speed with which the viewing window is changed may be determined based on the movement of the viewing window for the punchout of the visual content within the field of view of the visual content. The speed with which the viewing window is changed may increase with more/faster movement of the viewing window and may decrease with less/slower movement of the viewing window. In some implementations, the minimum speed may be set to zero so that when the viewing window is not moving, the shape and/or size of the viewing window cannot be changed.

In some implementations, the processor 11 may represent multiple processors, and at least one of the processors may be a remote processor located remotely from the housing of the image capture device (e.g., the image capture device 302). One or more of the functionalities of the components 102, 104, 106, 108 may be performed by the image capture device 302 (e.g., by the processor 310) and/or by a remote processor. For example, visual content stabilization using a dynamic punchout (functionalities of the dynamic stabilization component 108) may be performed by the remote processor during and/or post capture of the visual content by the image capture device. As another example, visual content stabilization using a dynamic punchout may be performed by the processor 310 during capture of the visual content to generate the stabilized visual content during capture of the visual content.

In some implementations, the visual content may not be stabilized in/near real time. For example, the image capture device may not have sufficient resource to apply the stabilization technique described herein in real-time and/or may be devoting its resources to other tasks. The stabilization of the visual content may be performed by the image capture device once sufficient resource becomes available. The stabilization of the visual content may be performed by the remote processor. For example, the remote processor may be one or more processors of a remote computing device (e.g., mobile device, desktop, server), and the remote processor may receive video information. The remote computing device (software running on the remote computing device) may apply the stabilization technique described herein post capture of the visual content by the image capture device. The post-capture stabilization of the visual content may be performed by the remote processor responsive to reception of the video information, responsive to user/system command to stabilize the visual content, responsive to the visual content being opened for playback, and/or responsive to other conditions.

In some implementations, the dynamic change in the viewing window and the stabilization of the visual content using the dynamic punchout of the visual content may be performed by the image capture device during capture of the visual content. The visual content captured by the image capture device may be stored in a buffer while stabilization is being performed. In some implementations, stabilization of the visual content may be performed after capture of the visual content by the image capture device. The visual content may be obtained after capture to perform post-capture stabilization of the visual content. Post-capture stabilization of the visual content may be performed by the image capture device and/or another computing device (e.g., mobile device paired with the image capture device, desktop device to which the visual content is transferred, server device to which the visual content is uploaded).

In some implementation, the stabilized visual content may be generated as an encoded visual content (e.g., an encoded video file). For example, the stabilized visual content may be generated as an encoded video clip, and the video clip may be opened in a video player for presentation. In some implementations, the stabilized visual content may be generated as instruction identifying/defining the viewing window to be used in providing a stabilized view of the visual content. A video play use the instructions to retrieve the extents of the video within the viewing window for presentation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for dynamically stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may include video content having a progress length. The video content may include visual content captured by an image capture device during a capture duration. The visual content may have a field of view. In some implementation, operation 201 may be performed by a processor component the same as or similar to the video information component 102 (Shown in FIG. 1 and described herein).

At operation 202, stabilization performance of the visual content using a punchout of the visual content within a viewing window may be determined. In some implementation, operation 202 may be performed by a processor component the same as or similar to the stabilization performance component 104 (Shown in FIG. 1 and described herein).

At operation 203, movement of the viewing window for the punchout of the visual content within the field of view of the visual content may be determined. In some implementation, operation 203 may be performed by a processor component the same as or similar to the movement component 106 (Shown in FIG. 1 and described herein).

At operation 204, the visual content may be stabilized using a dynamic punchout of the visual content. The dynamic punchout of the visual content may include a dynamic change in the viewing window for the punchout of the visual content based on the stabilization performance of the visual content using the punchout of the visual content within the viewing window, the movement of the viewing window for the punchout of the visual content within the field of view of the visual content, and/or other information. In some implementation, operation 204 may be performed by a processor component the same as or similar to the dynamic stabilization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamically stabilizing videos, the system comprising:

one or more physical processors configured by machine-readable instructions to:

obtain video information defining a video, the video including video content having a progress length, the video content including visual content captured by an image capture device during a capture duration, the visual content having a field of view;

determine stabilization performance of the visual content, the stabilization performance of the visual content indicating an extent to which stabilization is able to be performed using a punchout of the visual content within a viewing window;

determine movement of the viewing window within the field of view of the visual content, the movement of the viewing window within the field of view of the visual content including a change in placement of the viewing window within the field of view of the visual content between different video frames of the video; and dynamically change shape and/or size of the viewing window for the stabilization of the visual content based on the stabilization performance of the visual content and the movement of the viewing window within the field of view of the visual content.

2. The system of claim 1, wherein the stabilization performance of the visual content includes a number of times the stabilization requires the viewing window to extend beyond the field of view of the visual content and/or an amount of stabilization margin between the viewing window and the field of view of the visual content.

3. A system for dynamically stabilizing videos, the system comprising:

one or more physical processors configured by machine-readable instructions to:

obtain video information defining a video, the video including video content having a progress length, the video content including visual content captured by an image capture device during a capture duration, the visual content having a field of view;

determine stabilization performance of the visual content, the stabilization performance of the visual content indicating an extent to which stabilization is able to be performed using a punchout of the visual content within a viewing window;

determine movement of the viewing window within the field of view of the visual content; and dynamically change shape and/or size of the viewing window for the stabilization of the visual content based on the stabilization performance of the visual content and the movement of the viewing window within the field of view of the visual content.

4. The system of claim 3, wherein the stabilization performance of the visual content is determined based on a number of times the stabilization requires the viewing window to extend beyond the field of view of the visual content within a sliding window over the progress length.

5. The system of claim 3, wherein the stabilization performance of the visual content is determined based on an amount of stabilization margin between the viewing window and the field of view of the visual content.

6. The system of claim 5, wherein the amount of stabilization margin between the viewing window and the field of view of the visual content includes a distance between an edge of the viewing window and an edge of the visual content.

7. The system of claim 3, wherein the movement of the viewing window within the field of view of the visual content includes a change in placement of the viewing window within the field of view of the visual content between different video frames of the video.

8. The system of claim 3, wherein dynamically changing the shape and/or the size of the viewing window includes switching between a first viewing window and a second viewing window different from the first viewing window.

9. The system of claim 8, wherein the first viewing window is selected by a user for the stabilization of the visual content and the second viewing window is paired with the first viewing window for the stabilization of the visual content.

10. The system of claim 3, wherein dynamically changing the shape and/or the size of the viewing window includes mixing between a first viewing window and a second viewing window different from the first viewing window.

11. The system of claim 3, wherein the viewing window is dynamically changed for the stabilization of the visual content by the image capture device during capture of the visual content.

12. A method for dynamically stabilizing videos, the method performed by a computing system including one or more processors, the method comprising:

obtaining, by the computing system, video information defining a video, the video including video content having a progress length, the video content including visual content captured by an image capture device during a capture duration, the visual content having a field of view;

determining, by the computing system, stabilization performance of the visual content, the stabilization performance of the visual content indicating an extent to which stabilization is able to be performed using a punchout of the visual content within a viewing window;

determining, by the computing system, movement of the viewing window within the field of view of the visual content; and dynamically changing, by the computing system, shape and/or size of the viewing window for the stabilization of the visual content based on the stabilization performance of the visual content and the movement of the viewing window within the field of view of the visual content.

13. The method of claim 12, wherein the stabilization performance of the visual content is determined based on a number of times the stabilization requires the viewing window to extend beyond the field of view of the visual content within a sliding window over the progress length.

14. The method of claim 12, wherein the stabilization performance of the visual content is determined based on an amount of stabilization margin between the viewing window and the field of view of the visual content.

15. The method of claim 14, wherein the amount of stabilization margin between the viewing window and the field of view of the visual content includes a distance between an edge of the viewing window and an edge of the visual content.

16. The method of claim 12, wherein the movement of the viewing window within the field of view of the visual content includes a change in placement of the viewing window within the field of view of the visual content between different video frames of the video.

17. The method of claim 12, wherein dynamically changing the shape and/or the size of the viewing window includes switching between a first viewing window and a second viewing window different from the first viewing window.

18. The method of claim 17, wherein the first viewing window is selected by a user for the stabilization of the visual content and the second viewing window is paired with the first viewing window for the stabilization of the visual content.

19. The method of claim 12, wherein dynamically changing the shape and/or the size of the viewing window includes mixing between a first viewing window and a second viewing window different from the first viewing window.

20. The method of claim 12, wherein the viewing window is dynamically changed for the stabilization of the visual content by the image capture device during capture of the visual content.

* * * * *